(12) United States Patent
Bretagnol et al.

(10) Patent No.: US 11,762,194 B2
(45) Date of Patent: Sep. 19, 2023

(54) DEVICE FOR PROTECTING AN OPTICAL SENSOR

(71) Applicant: Valeo Systemes D'Essuyage, La Verriere (FR)

(72) Inventors: Frederic Bretagnol, Issoire (FR); Marcel Trebouet, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 753 days.

(21) Appl. No.: 16/612,831

(22) PCT Filed: May 17, 2018

(86) PCT No.: PCT/EP2018/062884
§ 371 (c)(1),
(2) Date: Nov. 12, 2019

(87) PCT Pub. No.: WO2018/211004
PCT Pub. Date: Nov. 22, 2018

(65) Prior Publication Data
US 2020/0192084 A1 Jun. 18, 2020

(30) Foreign Application Priority Data
May 17, 2017 (FR) ..................................... 1754343

(51) Int. Cl.
*G02B 27/00* (2006.01)
*B60S 1/08* (2006.01)
(Continued)

(52) U.S. Cl.
CPC .......... *G02B 27/0006* (2013.01); *B60R 11/04* (2013.01); *B60S 1/0848* (2013.01);
(Continued)

(58) Field of Classification Search
None
See application file for complete search history.

(56) References Cited

U.S. PATENT DOCUMENTS 3,879,742 A 4/1975 Smith
5,315,333 A 5/1994 Nash
(Continued)

FOREIGN PATENT DOCUMENTS

CN 1426154 A 6/2003
CN 1538776 A 10/2004
(Continued)

OTHER PUBLICATIONS

English Machine Translation of (DE 10325855 A1).*
(Continued)

*Primary Examiner* — Mohammed Jebari
(74) *Attorney, Agent, or Firm* — Valeo Systemes d'Essuyage

(57) ABSTRACT

The invention relates to a device for protecting an optical sensor for a motor vehicle, said optical sensor comprising an optic, a casing mounted to rotate about an axis of rotation (A1) and having a housing configured to receive the optical sensor, an optical element rigidly attached to the casing and configured to be arranged in the field of vision of the optical sensor, and an actuator coupled to the casing in order to rotate the casing and the optical element, the actuator comprising a rotor and a stator configured such that actuator is a motor with an internal rotor.

11 Claims, 2 Drawing Sheets

(51) Int. Cl.
  *G03B 17/08* (2021.01)
  *B60R 11/04* (2006.01)
  *H04N 23/51* (2023.01)
  *B60R 11/00* (2006.01)
  *B08B 7/00* (2006.01)

(52) U.S. Cl.
  CPC ............... *H04N 23/51* (2023.01); *B08B 7/00* (2013.01); *B60R 2011/0085* (2013.01); *B60R 2011/0092* (2013.01); *B60R 2300/101* (2013.01); *B60R 2300/40* (2013.01); *G03B 17/08* (2013.01)

(56) References Cited

U.S. PATENT DOCUMENTS

| | | | |
|---|---|---|---|
| 9,521,943 | B2 | 12/2016 | Sherwin |
| 2007/0217782 | A1 | 9/2007 | McCutchen et al. |
| 2011/0101812 | A1* | 5/2011 | Finkle .................. H02K 21/028 310/156.24 |
| 2011/0181725 | A1 | 7/2011 | Matsuura |
| 2015/0295476 | A1* | 10/2015 | Miyajima ............ H02K 11/215 310/68 B |
| 2016/0001330 | A1 | 1/2016 | Romack et al. |
| 2018/0226871 | A1* | 8/2018 | Howack ................ F16K 31/047 |

FOREIGN PATENT DOCUMENTS

| | | | | | |
|---|---|---|---|---|---|
| CN | 1704789 | A | | 12/2005 | |
| CN | 1845422 | A | * | 10/2006 | |
| CN | 2929270 | Y | * | 8/2007 | |
| CN | 101059592 | A | | 10/2007 | |
| CN | 101464561 | A | | 6/2009 | |
| CN | 101493565 | A | | 7/2009 | |
| CN | 101528506 | A | | 9/2009 | |
| CN | 102135705 | A | | 7/2011 | |
| CN | 201893653 | U | | 7/2011 | |
| CN | 103278999 | A | | 9/2013 | |
| CN | 103580364 | A | | 2/2014 | |
| CN | 104364525 | A | | 2/2015 | |
| CN | 204696811 | U | | 10/2015 | |
| CN | 105780373 | A | * | 7/2016 | |
| CN | 106054499 | A | | 10/2016 | |
| DE | 10325855 | A1 | * | 12/2003 | ................ H02P 6/10 |
| FR | 2766026 | A1 | * | 1/1999 | ............ H02K 15/16 |
| JP | 2008165093 | A | | 7/2008 | |
| JP | 2013523372 | A | | 6/2013 | |
| KR | 20070034729 | A | | 3/2007 | |
| KR | 101616713 | B1 | | 5/2016 | |

OTHER PUBLICATIONS

Int'l Search Report for PCT/EP2018/062884, dated Jul. 30, 2018.
Chinese Patent Office, First Search of corresponding Application No. CN 201880032222.8, dated Jan. 6, 2021.
Chinese Patent Office, Supplemental Search of corresponding Application No. CN 201880032222.8, dated Nov. 29, 2021.
Chinese Patent Office, Office Action 1 of corresponding Application No. CN 201880032222.8, dated Dec. 17, 2020.
Chinese Patent Office, Office Action 2 of corresponding Application No. CN 201880032222.8, dated Sep. 24, 2021.
Chinese Patent Office, Office Action 3 of corresponding Application No. CN 201880032222.8, dated Feb. 18, 2022.
Japanese Patent Office, Office Action (with English translation) of corresponding Japanese Patent Application No. 2019-563541, dated May 6, 2022.

* cited by examiner

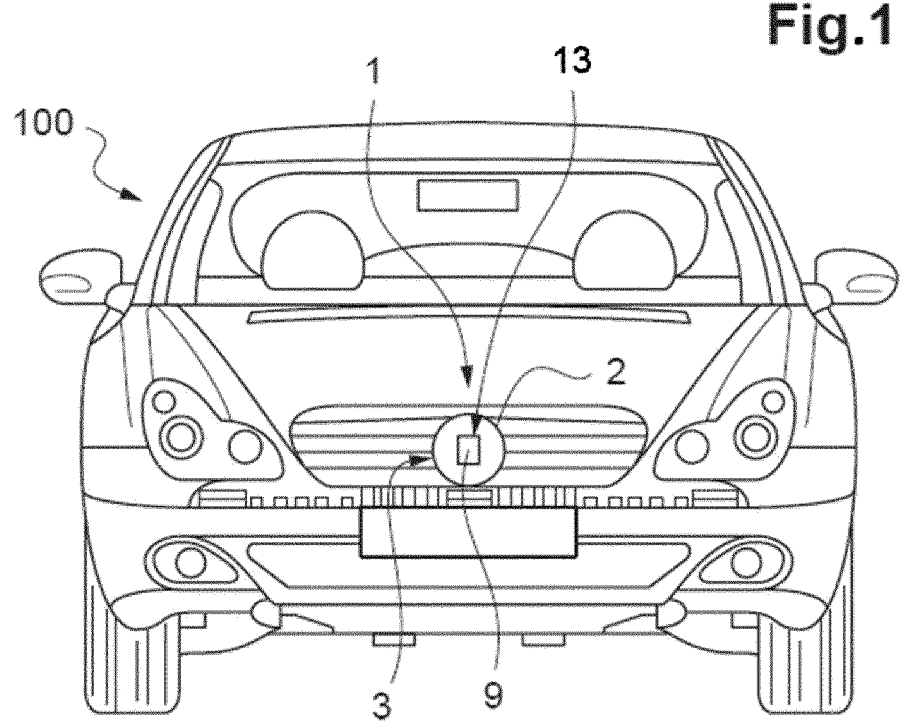
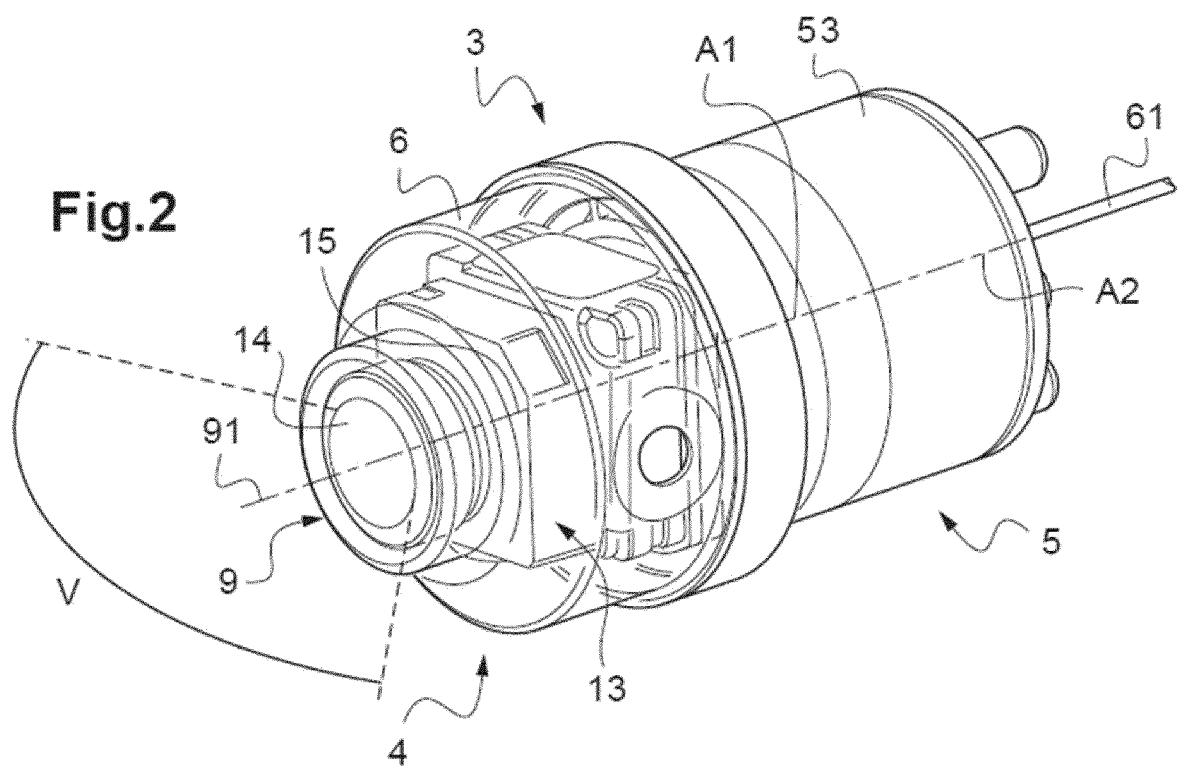

DEVICE FOR PROTECTING AN OPTICAL SENSOR

CROSS-REFERENCE TO RELATED APPLICATIONS

This application is filed under 35 U.S.C. § 371 U.S. National Phase of International Application No. PCT/EP2018/062884 filed May 17, 2018 (published as WO2018211004), the disclosure of which is herein incorporated by reference in its entirety.

TECHNICAL FIELD

The present invention relates to the field of driving assistance and particularly to driving assistance systems, installed on certain vehicles, wherein the driving assistance system can include an optical sensor, like, for example, a camera comprising an objective, particularly comprising at least one lens. More particularly, the invention relates to a device for protecting such an optical sensor.

BACKGROUND OF THE INVENTION

Today, viewing front, rear, or side cameras are provided on a large number of motor vehicles. Notably, they are part of driving assistance systems, such as parking assistance systems, or lane departure detection systems.

Cameras are known which are fitted inside the passenger compartment of a vehicle against the rear window/glass directed toward the rear from the rear window of the vehicle. These cameras are well protected from the weather influences outside and fouling caused by organic or inorganic pollutants. However, the viewing angle for such cameras, fitted inside the passenger compartment, is not optimal, in particular for parking assistance, since they do not make it possible to see the obstacles that are located close to the rear of the vehicle, for example.

For this reason, it is therefore preferable for the cameras of the driving assistance systems to be fitted outside the vehicles at various locations depending on the desired use, for example at the rear or front bumper, or at the rear or front license plate of the vehicle. In this case, the camera is therefore greatly exposed to the splashes of inorganic or organic dirt which can be deposited on the optic thereof and thus reduce the effectiveness thereof, or render it inoperable. In particular, when it rains, splashes of rain and dirt are observed which can greatly affect the operability of the driving assistance system comprising such a camera. The surfaces of the optics of the cameras must be cleaned in order to ensure the good operating state thereof.

BRIEF SUMMARY OF THE INVENTION

To counter the depositing of dirt on the camera, it is known to arrange a device for cleaning the optic of the camera, generally a cleaning liquid jet, close thereto, in order to get rid of the polluting elements which have been deposited over time. However, the use of these jets leads to an increase in the operating costs of such a driving assistance system since they require the use of quite large quantities of cleaning liquid.

Lastly, the applicant has developed another device for cleaning the camera optic, which includes a casing mounted rotatably about a rotation axis and which has a housing configured to receive an optical sensor, an optical element rigidly connected to the casing, the optical element having at least one transparent surface placed in the field of vision of the optical sensor and an actuator coupled to the casing in order to rotate the casing and the optical element and thus allow the elimination of fouling by a centrifugal effect. The document WO2018/019662 discloses such a cleaning device.

The aim of the invention is to protect an alternative to the cleaning device illustrated in this document, which is distinguishable notably in the form of the actuator and the cooperation thereof with the casing.

In this context, the invention relates to a device for protecting an optical sensor for a motor vehicle, said optical sensor comprising an optic, characterized in that the device includes:

a casing mounted rotatably about a rotation axis and having a housing configured to receive the optical sensor, an optical element rigidly connected to the casing and configured to be placed in the field of vision of the optical sensor, and an actuator coupled to the casing in order to rotate the casing and the optical element, the actuator including a rotor and a stator which are configured such that the actuator is a motor having an internal rotor.

Preferably, at least part of the rotor extends inside a volume defined by the stator, said at least part of the rotor carrying a magnetic mass.

Advantageously, the invention thus makes it possible to place the rotating part at the center of the motor, which makes it possible to reduce the noise and the unbalance which are caused by the rotation of the rotor carrying a magnetic mass.

This feature is notably accompanied by a stepped profile of the rotor and, where applicable, by an intermediate piece associated with this rotor, such as to allow one end to be constrained to rotate with the casing which must be big enough to surround the optical sensor and the opposite end to be as close as possible to the rotation axis of the casing such as to reduce the overall spatial requirement of the actuator.

The casing can be fixed directly on the rotor. In this case, the rotor can include three successive portions forming an actuating portion carrying a magnetic mass, a guide portion and a drive portion rigidly connected to the casing. Preferably, the drive portion has an average diameter with a value greater than the value of the average diameter of the actuating portion. Preferably, such a rotor consists of a single piece.

Alternatively, the protecting device can include an intermediate piece forming a link between the casing and the rotor. In this case, the rotor can include an actuating portion carrying a magnetic mass and the intermediate piece can include a drive portion rigidly connected to the casing and a guide portion linking the drive portion to the actuating portion of the rotor. The intermediate piece can furthermore have an overlapping ring extending the guide portion and overlapping one of the ends of the stator.

According to various features of the invention, taken individually or in combination, it is possible for:

the actuator to be a hollow motor;
the optical sensor to be extended at one axial end by a support shank housed at least partially inside the rotor internal to the hollow motor;
the protecting device to include a mobile part and a fixed part, the mobile part including at least the rotor and the casing, and the fixed part including at least the stator, and the protecting device includes at least one rolling bearing, preferably two, that are arranged between the mobile part and the fixed part;

at least one of the rolling bearings to be arranged between the rotor and the support shank;

the stator to include a transverse wall perpendicular to the rotation axis of the casing and placed in the opposite direction to the optical element, the transverse wall including a sleeve for receiving an end of the support shank.

The invention also relates to a driving assistance system including an optical sensor comprising an optic. According to the invention, said system further includes a device for protecting the optical sensor as defined above.

BRIEF DESCRIPTION OF THE DRAWINGS

Other features and advantages of the invention will emerge more clearly upon reading the following description, given by way of illustrative and nonlimiting example, and with reference to the appended drawings wherein;

FIG. 1 schematically represents a motor vehicle comprising a driving assistance system according to the invention, FIG. 2 is a perspective view of a device for protecting an optical sensor of the assistance system of FIG. 1.

DETAILED DESCRIPTION OF THE INVENTION

Figure 3:
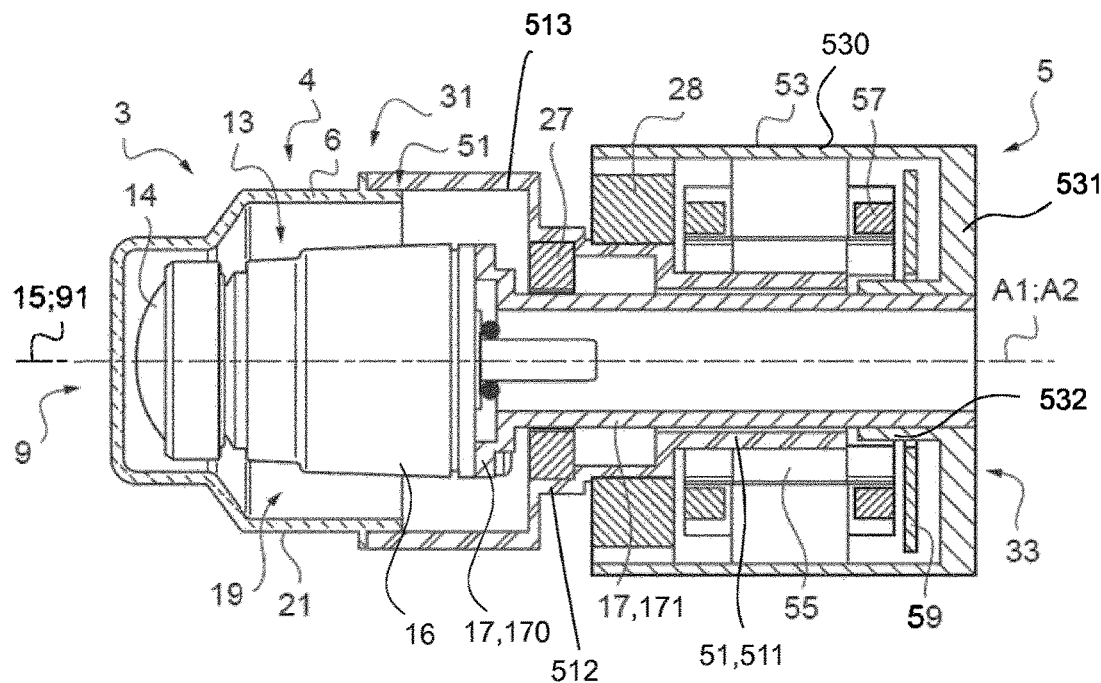
FIG. 3 is a partial longitudinal section view of the protecting device of FIG. 2 according to a first embodiment.

FIG. 1 shows a motor vehicle 100 provided with at least one driving assistance system 1 according to the invention. The driving assistance system 1 notably includes at least one optical sensor 13 and a protecting device 3, which is more clearly visible in FIGS. 2 to 4, surrounding the optical sensor 13.

According to the example illustrated in FIG. 1, the driving assistance system 1 is mounted at the front of the vehicle 100 at a bumper. Of course, in a variant, the protecting device 3 can be mounted at the rear of the vehicle 100, for example at the bumper or license plate. For example, it can also be mounted on the sides of the vehicle, for example at the rear vision mirrors.

The protecting device 3 can be fixed according to any known technique, on any element 2 of the vehicle 100, such as a body element or an exterior element such as a bumper, a rear vision mirror or a license plate. To this end, a non-exhaustive list can include a clip system, a screwing system, or a sticking system.

The protecting device 3 is configured and dimensioned to receive and house the optical sensor 13.

The optical sensor 13 is, for example, an image recording optical sensor such as a camera. It can be a CCD ("charged coupled device") sensor or a CMOS sensor including an array of miniature photodiodes. According to another variant, it can be a light detection and ranging sensor called a LIDAR sensor.

As is more visible in FIG. 2, the optical sensor 13 includes an optic 14 with an optical axis 15. The optic 14 is, for example, an objective. An objective can include at least one lens, in particular several lenses depending on the field of vision and the resolution, for example between two and ten lenses, generally four or five lenses, or ten lenses in the case of a so-called fisheye optic. At least one of the lenses of the optic 14 is, for example, convex (domed) with a convexity orientated toward the outside of the optical sensor 13, such as a so-called fisheye optic.

The optic 14 is mounted at a first end, namely the front end, of a sensor body 16 in which an electronic unit 160 for managing the optic is notably placed. Moreover, the sensor body is extended axially, i.e. in the direction parallel to the optical axis 15, rearward, i.e. away from the optic 14, by a support 17 forming part (visible in FIGS. 3 and 4) of the optical sensor 13.

The support 17 has a shape generated by revolution around the optical axis 15, with a base 170 fixed on the sensor body 16 and a support shank 171 which axially extends the base. The support shank 171 is hollow and it allows the passage of cables linking the electronic unit 160 for managing the optic to a network of the vehicle by means of cables which are not shown in this case.

The protecting device 3 includes at least one attachment 4 mounted rotatably about a rotation axis A1 and having the function of protecting the optical sensor 13, and an actuator, more precisely a motor 5, configured to rotate the attachment 4. The protecting device 3 is therefore a motorized device.

The attachment 4 of the protecting device 3 includes a casing 6 and an optical element 9 rigidly connected to the casing 6, with, in the illustrated embodiments, an optical element 9 produced as a single piece with the casing 6. In an alternative, the casing 6 and the optical element 9 can be produced by two rigidly connected separate pieces.

The optical element 9 and the casing 6 are described in greater detail hereafter.

As regards the casing 6, it is mounted rotatably about a substantially parallel rotation axis A1, where applicable merged with the optical axis 15.

Preferably, the casing 6 is a sealed casing. The casing 6 can be produced from any suitable material known to a person skilled in the art.

More specifically, this casing 6 is arranged such as to be rotated by the motor 5, which allows the rotation of the optical element 9. The optical element 9 is therefore, in this particular example, configured to be rotated with the casing 6, such as to allow cleaning of the optical element 9 by centrifugal effect.

The optical element 9 is configured to be placed at the front of the casing 6. The front of the casing 6 extends from the casing 6 part intended to face the road scene, for which the optical sensor 13 is involved in the image recording process, when the protecting device 3 is mounted on the vehicle 100 (also with reference to FIG. 1). Conversely, the rear of the casing 6 extends from the casing 6 part opposite the front of the casing 6 and is therefore the part furthest from the road scene, for which the optical sensor 13 is involved in the image recording process.

As illustrated, the optical sensor 13 is mounted in the protecting device such that the sensor body 16 is housed at least partly in the casing 6 while the optic 14 faces the optical element 9. For this purpose, the casing 6 is configured such as to form a housing 19 (see FIG. 3) dimensioned such as to receive the optical sensor 13, for example such that the optical axis 15 of the optical sensor 13 is merged with the rotation axis A1 of the casing 6.

More precisely, the casing 6 includes a wall 21 defining the housing 19 for the optical sensor 13. This wall 21 can be centered around the rotation axis A1 of the optical element 9 and of the casing 6. In this example, the wall 21 has a substantially cylindrical general shape.

According to a first variant, the wall 21 can be produced as a single piece with the optical element 9. According to a second variant, the wall 21 and the optical element 9 can be produced by two separate pieces, and in this case the optical element 9 is rigidly connected to the wall 21 at a front end of the latter. By way of nonlimiting example, the rigid connection between the wall 21 and the optical element 9 can be achieved by ultrasonic bonding.

Thus, the casing 6 and the optical element 9 can be produced as one or more pieces. Since the casing 6 is rigidly connected to the optical element 9, this forms a sealed block thus preventing the introduction of fouling inside the casing 6 intended to receive the optical sensor 13.

The optical element 9 is intended to protect the optic 14 of the optical sensor 13 from possible splashes of fouling or solid debris which could damage this optic 14. It is therefore a protecting element, or more precisely a protecting shield for the optical sensor 13, and it is the optical element 9 which is subjected to the external aggression, i.e. both splashes of water, of pollutants, of gravel and deposits of pollutants or streaks of water.

According to the described embodiment, the optical element 9 is separate from the optical sensor 13.

This optical element 9 has an optical axis 91.

The optical element 9 is arranged at the front of the protecting device 3. In other words, the optical element 9 is arranged at the front of the casing 6. The front of the protecting device 3 extends from the part intended to face the road scene, for which the optical sensor 13 is involved in the image recording process, when the protecting device 3 is mounted on the vehicle 100 (FIG. 1). Conversely, the rear of the protecting device 3 is the part opposite the front and the optical element 9; therefore, this is the part furthest from the road scene, for which the optical sensor 13 is involved in the image recording process.

The optical element 9 is intended to be placed upstream of the optical sensor 13, more precisely upstream of the optic 14 (FIGS. 2 and 3). In the present invention, the term upstream is defined with respect to the optical axis 15 and with respect to the road scene, for which the optical sensor 13 is involved in the image recording process. In other words "upstream" of the optic 14 means a position in which the optical element 9 is placed between the optic 14 and the road scene, for which the optical sensor 13 is involved in the image recording process, along the optical axis 15.

This optical element 9 is advantageously dimensioned such as to overlap the entire surface of the optic 14. The optical element 9 is therefore arranged in the field of vision of the optical sensor 13. To this end, the optical element 9 is advantageously transparent such as to not affect the effectiveness of the optical sensor 13. This optical element 9 can be produced from glass or from a transparent plastic such as polycarbonate.

The optical element 9 can be arranged such as to be centered with respect to the optical sensor 13, more precisely centered with respect to the optic 14. The optical element 9 is arranged such that the optical axis 91 thereof is merged with the optical axis 15 of the optical sensor 13.

As stated above, the optical element 9 is rigidly connected to the casing 6, and it is therefore constrained to rotate with the casing 6. Thus, the optical element 9 is also mounted rotatably about the rotation axis A1. More precisely, the casing 6 can be arranged such as to be rotated by the motor 5, which allows the rotation of the optical element 9. The optical element 9 is therefore configured to be rotated with the casing 6, such as to allow cleaning of the optical element 9 by a centrifugal effect.

Advantageously, the rotation axis A1 of the optical element 9 is merged with the optical axis 15 of the optical sensor 13. This rotation axis A1 is also merged with the optical axis 91 of the optical element 9.

The optical element 9 can be placed to be centered with respect to the rotation axis A1. This optical element 9 notably has a rotational symmetry with respect to the rotation axis A1.

Moreover, when the protecting device 3 receiving the optical sensor 13 is mounted on the vehicle 100, (with reference also to FIG. 1), the optic 14 and the optical element 9 advantageously project from an opening provided on the element 2 of the vehicle 100.

The motor 5 will now be described in greater detail, referring notably to a first embodiment illustrated in FIG. 3 and a second embodiment illustrated in FIG. 4.

The motor 5 is assembled at the rear of the casing 6, i.e. on the opposite side to the optical element 9. More specifically, the motor 5 is arranged as a continuation of the optical sensor 13. This therefore forms a sealed block therefore preventing the introduction of fouling inside the casing 6 intended to receive the optical sensor 13. It is possible to provide a sealed arrangement at the rear of the motor 5 for the passage of the cables or wires such as to limit the inlet of water vapor and/or other contaminants inside the protecting device 3.

The motor 5 can notably be an electric motor of small size, or miniature.

An electric motor of small size means, within the context of the present invention, a stepping motor, an actuator, a brushed or brushless direct current motor, an asynchronous motor or a synchronous motor, the weight of which is less than 10 kg, or less than 1 kg, which are in particular used to actuate equipment for the vehicles.

Miniature electric motor means, within the context of the present invention, a stepping motor, an actuator, a brushed or brushless direct current motor, an asynchronous motor or a synchronous motor, the weight of which is less than 200 g, or less than 100 g, preferably between 30 g and 100 g, for example between 30 g and 60 g.

The motor 5 includes a rotor 51 and a fixed stator 53, the rotor 51 being rotatable with respect to the fixed stator 53. By way of nonlimiting example, the motor 5 can more particularly be a brushless motor.

The motor 5 is fixed to a structural element of the vehicle which is not represented in this case, by means of the stator and this motor 5 is coupled to the casing 6 in order to rotate the casing 6 and the optical element 9. The casing 6 and the optical element 9 are rigidly connected to the rotor 51 of the motor 5.

The motor 5 is thus configured and dimensioned to rotate the casing 6 and the optical element 9 rigidly connected to the casing 6.

The motor 5 is mounted rotationally around a rotation axis A2. The motor 5 is, for example, arranged such that the rotation axis A2 thereof is merged with the rotation axis A1 of the optical element 9, with the optical axis 15 of the optical sensor 13, and with the optical axis 91 of the optical element 9.

The motor 5 is advantageously a hollow motor 5. It can receive at least partly the optical sensor 13 and more particularly the support shank 17. In this manner, the hollow motor 5 can be crossed by the support shank and therefore, as has been described above, by cables linking the electronic unit 160 for managing the optic to a network of the vehicle.

According to the invention, the motor 5 is a motor having an internal rotor, i.e. the stator 53 is arranged around at least part of the rotor 51.

According to the invention, the rotor 51 is hollow and provides a central passage for the support shank 17. A clearance is provided between the external surface of the support shank and the internal face defining the central passage of the rotor 51, such as to allow the rotor 51 to rotate around the support shank 17.

In the illustrated examples, the motor 5 comprises at least one magnet 55 constrained to rotate with the rotor 51, and a predefined number of electromagnetic coils 57, in particular at least four electromagnetic coils 57 mounted on the stator 53. The electromagnetic coils 57 are intended to be powered in order to allow the magnet 55 rigidly connected to the rotor 51 to be driven. The motor 5 comprises, to this end, a control circuit 59 for powering the electromagnetic coils 57. This control circuit 59 can be linked to a power supply harness 61 linked to the general electric circuit of the vehicle 100 (with reference to FIG. 2).

It follows from the above and from the description common to the various exemplary embodiments that the protecting device 3 includes a mobile part 31, also called rotating part 31, and a fixed part 33 (see FIG. 3).

The mobile part 31 firstly comprises at least the rotor 51 of the motor 5, and secondly at least a mobile element constrained to rotate with the rotor 51, such as, notably, the casing 6 and the associated optical element 9.

Moreover, the fixed part 33 comprises firstly at least the stator 53 of the motor 5 and secondly at least one element or support fixed to the stator 53. In the illustrated example, the fixed part 33 of the motorized device 3 includes the support shank 17 rigidly connected to the optical sensor 13, this support shank 17 being fixed to the stator 53.

Figure 4:
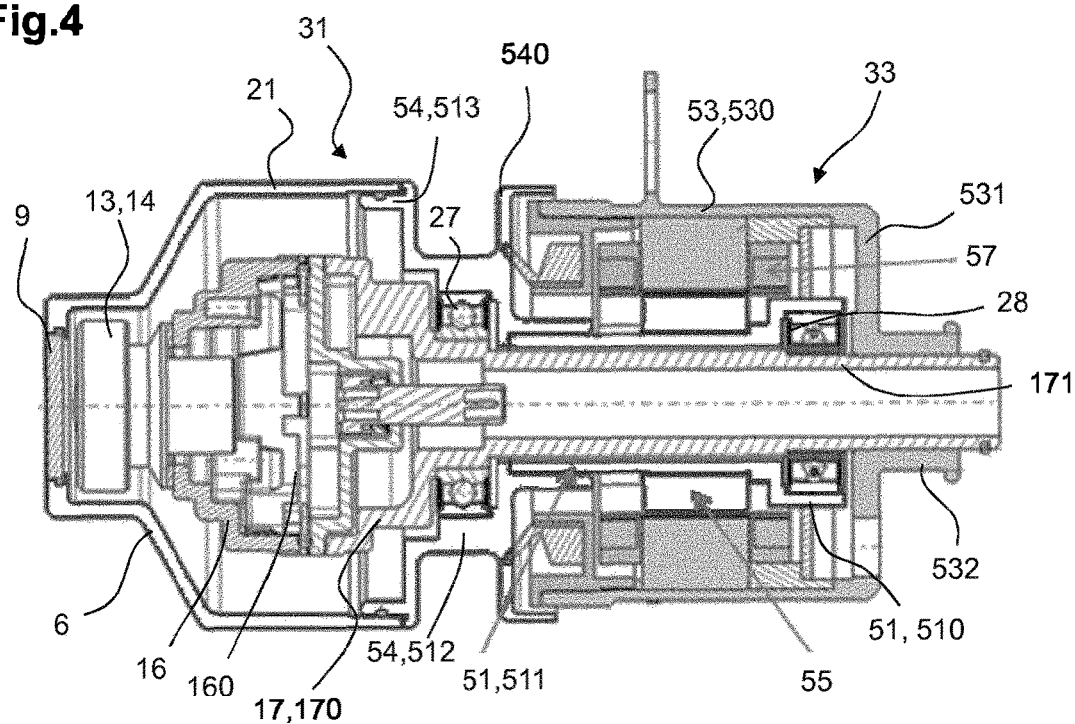
FIG. 4 is a partial longitudinal section view of the protecting device of FIG. 2 according to a second embodiment.

To rotate the mobile part 31, the protecting device 3 can particularly comprise one or more rolling bearings 27, 28 represented schematically in FIGS. 3 and 4. In the illustrated examples, without these being limiting, the protecting device 3 comprises two rolling bearings 27, 28.

These rolling bearings 27, 28 are each arranged between the mobile part 31 and the fixed part 33 of the protecting device 3. The rolling bearings 27, 28 have a substantially annular general shape. Moreover, the two rolling bearings 27, 28 are arranged concentrically with the motor 5.

A first embodiment of the protecting device is illustrated in detail in FIG. 3.

The stator 53 includes a peripheral wall 530 forming a cylinder centered on the rotation axis A2 and a transverse wall 531 which substantially perpendicularly extends the peripheral wall and which axially defines the stator at an end of this peripheral wall.

The transverse wall has a hole centered on the rotation axis A2 of the motor and dimensioned to allow passage for the support shank 17 rigidly connected to the optical sensor. This hole is bordered by a sleeve 532 which extends the transverse wall 531 toward the inside of the motor. This sleeve 532 is notably configured to allow the stator to be fixed on the support shank 17. The sleeve surrounds the free end of the support shank, in the direction away from the optical sensor. The fixing between these two elements is a fixing via tightfitting, or by welding without this being exhaustive as long as the stator and the support shank together form part of the fixed part 33.

As illustrated, the sleeve 532 can support a control circuit 59 for powering the electromagnetic coils 57.

The rotor 51 has a stepped shape with three distinct portions.

A first portion of the rotor, which portion is placed inside the volume defined by the stator, consists of an actuating portion 511, carrying the magnet 55 allowing the rotation of the rotor inside the stator. This first portion has a first diameter, the value of which is a function of the value of the diameter of the support shank 17, such as to allow the rotation around this fixed element formed by the support shank and to allow the smallest possible spatial requirement of the motor.

A second portion of the rotor, extending partly inside the volume defined by the stator and partly outside this, consists of a guide portion 512, on which the rolling bearings rest, that facilitate the rotational guidance of the rotor inside the stator. This second position can, where applicable, as illustrated in FIG. 3, have a shoulder forming abutment surfaces for the positioning of the rolling bearings. This second portion has a second average diameter, the value of which is greater than the value of the first diameter of the actuating portion 511, thus forming a step between the actuating portion and a third portion of the rotor.

The third portion of the rotor, which portion is placed outside the volume defined by the stator, consists of a drive portion 513, rigidly connected at the free end thereof to the rear end of the attachment 4, in this case the free end of the casing 6. This third portion has a third diameter, the value of which, greater than the value of the second portion of the rotor, is a function of the value of the diameter of the casing 6, such as to allow the rigid connection of the rotor and of the casing to be rotated in order to eliminate the fouling.

In this embodiment, the two rolling bearings are placed in the area of the guide portion 512 of the rotor 51. A first rolling bearing 27 is placed inside the rotor, between the internal face of the guide portion and the support shank 17, whereas a second rolling bearing 28 is placed substantially in the same area, this time in contact with the external surface of the guide portion 512, between this guide portion and the internal face of the peripheral wall of the stator.

A second embodiment of the protecting device is illustrated in detail in FIG. 4, and this second embodiment differs from the first embodiment notably in that the sleeve 532 which extends the transverse wall 531 of the stator is, in this case, oriented outward. As above, the sleeve 532 surrounds the free end of the support shank 17 and the two elements are rigidly connected.

This results in a gain in space in the area facing the internal face of the transverse wall, and the second rolling bearing 28 is, in this embodiment, placed in this area. More particularly, the second rolling bearing 28 is placed between the support shank 17 and a ring 510 formed at the rotor end placed facing the transverse wall 531 of the stator, the ring 510 having a greater diameter than the rest of the actuating portion 511 of the rotor housed in the internal volume of the stator as described above. In this manner, the two rolling bearings 27, 28 are distanced from one another and placed advantageously in proximity to the axial ends of the rotor, which improves the rotational guidance performances and therefore the performances of the motor. This improvement furthermore makes it possible to use small rolling bearings, which has the advantage of reducing the mechanical friction between the rotor and the support shank 17.

In this second embodiment, the motor 5 differs notably in that the rotor 51 is not directly linked to the casing 6, but via an intermediate piece 54.

As illustrated, it is the intermediate piece 54 which includes the guide portion 512 and the drive portion 513 linked to the casing 6. In this second embodiment, the intermediate piece 54 furthermore includes an overlapping ring 540 which extends the guide portion 512 in order to overlap the open end of the stator, in the opposite direction to the transverse wall 531.

The intermediate piece is welded on the rotor and forms therewith a rotationally constrained assembly for driving the casing 6 and the optical element 9.

Advantageously, this intermediate piece can be produced from a material that is different to that of the rotor, which can improve the fixing of the rolling bearing 27 placed between the internal face of the guide portion 512 and the support shank 17.

Such an optical sensor protecting device having a motor with an internal rotor has the advantage of a magnet 55 placed inside the space defined by the electromagnetic coils 57 of the stator, and this makes it possible to use a magnet of limited size and therefore to reduce the mass of the protecting device.

In operation, the actuator, more precisely the motor 5 rotates the casing 6 and the optical element 9 rigidly connected to the casing 6, with respect to the optical sensor 13. The rotation of the casing 6 and of the optical element 9 eliminates the fouling due to the centrifugal force to which the latter are subjected. The field of vision V of the optical sensor 13 is thus always clear and clean.

The magnetic mass, i.e. the magnet 55, is rigidly connected to the internal rotor according to the invention. This configuration is particularly advantageous in that the unbalance created by the rotation of the magnetic mass is placed as close as possible to the rotation axis of the motor. The noise generated by the rotation of the magnet is thus reduced.

The preceding description clearly explains how the invention makes it possible to achieve the objectives set thereby and notably to propose an optical sensor protecting device which allows effective cleaning of a sensor of a driving assistance system, notably with a reduced spatial requirement and operating noise.

The invention cannot be limited to the embodiments specifically given in this document as nonlimiting examples, and particularly covers all equivalent means and any technically effective combination of these means. Thus, the features, the variants and the various forms of embodiments of the invention can be brought together, in various combinations, insofar as they are not incompatible or exclusive with respect to one another. Notably, it is possible to envisage variants of the invention that only comprise a selection of described features, as long as, in accordance with the invention, the protecting device includes a motor having an internal rotor.

The invention claimed is:

1. A protecting device for protecting an optical sensor for a motor vehicle, the optical sensor including an optic, the device comprising:
    a casing mounted rotatably about a rotation axis and having a housing configured to receive the optical sensor,
    an optical element rigidly connected to the casing and configured to be placed in the field of vision of the optical sensor, and
    an actuator coupled to the casing in order to rotate the casing and the optical element, the actuator including a rotor and a stator which are configured such that the actuator is a motor having an internal rotor, with the rotor including three successive portions forming an actuating portion carrying a magnetic mass configured to drive the rotor, a guide portion for guiding the rotor inside the stator, and a drive portion rigidly connected to the casing, with the drive portion having an average diameter with a value greater than the value of the average diameter of the actuating portion.

2. The protecting device as claimed in claim 1, wherein at least part of the rotor extends inside a volume defined by the stator, the at least part of the rotor carrying the magnetic mass is a middle part of the rotor.

3. The protecting device as claimed in claim 1, wherein the casing is fixed directly on the rotor.

4. The protecting device as claimed in claim 1, further comprising an intermediate piece forming a link between the casing and the rotor.

5. The protecting device as claimed in claim 4, wherein the intermediate piece includes an intermediate drive portion rigidly connected to the casing and an intermediate guide portion linking the intermediate drive portion to the drive portion of the rotor.

6. The protecting device as claimed in claim 4, wherein the intermediate piece has an overlapping ring extending the guide portion and overlapping one of the ends of the stator with the overlapping ring surrounding a portion of the stator.

7. The protecting device as claimed in claim 1, wherein the actuator is a hollow motor.

8. The protecting device as claimed in claim 1, wherein the optical sensor is extended at one axial end by a support shank housed at least partially inside the rotor internal to the hollow motor.

9. The protecting device as claimed in claim 1, further comprising a mobile part and a fixed part, the mobile part including at least the rotor and the casing, and the fixed part including at least the stator and further comprising at least one first rolling bearing arranged between the mobile part and the fixed part.

10. The protecting device as claimed in claim 9, further comprising at least one second rolling bearings is arranged between the rotor and a support shank.

11. The protecting device as claimed in claim 1, wherein the stator includes a transverse wall perpendicular to the rotation axis of the casing and placed in the opposite direction to the optical element, the transverse wall including a sleeve for receiving an end of a support shank.

* * * * *